United States Patent [19]

Cobb, Jr.

[11] Patent Number: 4,805,984
[45] Date of Patent: Feb. 21, 1989

[54] TOTALLY INTERNALLY REFLECTING LIGHT CONDUIT

[75] Inventor: Sanford Cobb, Jr., St. Mary's Point, Minn.

[73] Assignee: Minnesota Mining and Manufacturing Company, St. Paul, Minn.

[21] Appl. No.: 903,657

[22] Filed: Sep. 5, 1986

Related U.S. Application Data

[63] Continuation-in-part of Ser. No. 799,869, Nov. 21, 1985, abandoned, and Ser. No. 819,118, Jan. 15, 1986, abandoned.

[51] Int. Cl.⁴ ............................................. G02B 6/00
[52] U.S. Cl. .............................. 350/96.28; 350/96.10; 350/259; 350/265
[58] Field of Search ............... 350/96.10, 96.24, 96.27, 350/96.28, 96.29, 96.30, 96.34, 259, 262, 264, 265

[56] References Cited

U.S. PATENT DOCUMENTS

| | | | |
|---|---|---|---|
| Re. 28,100 | 8/1974 | Long | 340/34 |
| 247,229 | 9/1881 | Wheeler | 350/96.1 |
| 729,660 | 6/1903 | Poulson | 350/264 |
| 1,837,091 | 12/1931 | Adams | 362/301 |
| 2,022,144 | 11/1935 | Nicolson | 88/25 |
| 2,218,227 | 10/1940 | Winnek | 18/61 |
| 2,232,551 | 2/1941 | Merton | 18/57 |
| 2,279,555 | 4/1942 | Browne et al. | 88/24 |
| 3,263,126 | 7/1966 | Westberg | 315/241 |
| 3,312,853 | 4/1967 | Mela | 313/218 |
| 3,369,149 | 2/1968 | Grant | 315/168 |
| 3,386,043 | 5/1968 | Marcatili et al. | 330/4.3 |
| 3,417,288 | 12/1968 | Cason, III | 315/241 |
| 3,436,141 | 4/1969 | Comte | 350/96 |
| 3,506,331 | 4/1970 | Kompfner | 350/45 |
| 3,511,559 | 5/1970 | Foster | 350/258 |
| 3,583,786 | 6/1971 | Marcatili | 350/96 WG |
| 3,641,332 | 2/1972 | Reick et al. | 240/1 EI |
| 3,740,112 | 6/1973 | Lundgren | 350/96 T |
| 3,832,029 | 8/1974 | Bryngdahl | 350/96 T |
| 3,908,056 | 9/1975 | Anderson | 428/142 |
| 3,913,872 | 10/1975 | Weber | 240/41 R |
| 3,973,828 | 8/1976 | Onoda et al. | 350/96 WG |
| 4,120,565 | 10/1978 | Rabl et al. | 350/286 |
| 4,154,219 | 5/1979 | Gupta et al. | 126/270 |
| 4,235,515 | 11/1980 | Sheiman et al. | 350/138 |
| 4,260,220 | 4/1981 | Whitehead | 350/96.28 |
| 4,297,000 | 10/1981 | Fries | 350/96.24 |
| 4,389,085 | 6/1983 | Mori | 350/96.10 |
| 4,422,719 | 12/1983 | Orcutt | 350/96.30 |
| 4,453,803 | 6/1984 | Hidaka et al. | 350/96.32 |
| 4,466,697 | 8/1984 | Daniel | 350/96.30 |
| 4,615,579 | 10/1986 | Whitehead | 350/96.10 |

Primary Examiner—John D. Lee
Assistant Examiner—Phan Heartney
Attorney, Agent, or Firm—Donald M. Sell; Stephen W. Buckingham

[57] ABSTRACT

A hollow, tubular light conduit including a wall of a transparent polymeric material, and the wall having a structured surface and an opposite, smooth, glossy surface, and at least a portion of the cross-section of the wall lying in a smooth arcuate curve, wherein light striking the inner surface, within an acceptable angular range, is contained by total internal reflection. The structured surface includes a linear array of substantially right angled isosceles prisms arranged side-by-side to form grooves. In addition, the perpendicular sides of the prisms make an angle of approximately 45° with the tangent to the smooth surface. Because of the flexibility of the light conduit and its ability to totally internally reflect light, a manipulated light conduit may be utilized in a variety of ways, for example, as a light fixture whereby some of the light directed into the light conduit is emitted from the light conduit for illumination or for use as a secondary light source. A suitable light source may include artificial or solar energy. However, when the light fixture operates as a warning light it is preferred that a strobe light be used.

36 Claims, 7 Drawing Sheets

TOTALLY INTERNALLY REFLECTING LIGHT CONDUIT

CROSS-REFERENCE TO RELATED APPLICATIONS

This is a continuation-in-part of application Ser. No. 799,869, filed Nov. 21, 1985, and application Ser. No. 819,118, filed Jan. 15, 1986, both now abandoned, the disclosures of which are hereby incorporated by reference.

FIELD OF THE INVENTION

The present invention relates to a light conduit for transporting and/or distributing light and specifically to a hollow, tubular light conduit of a transparent material having a structured surface on one side and a smooth surface opposite the structured surface on the other side, one aspect of which is that the combination of surfaces will totally internally reflect light.

BACKGROUND OF THE INVENTION

It is known to use optical light pipes or light guides including a semi-solid or solid optical fiber to transport light, as illustrated in U.S. Pat. Nos. 4,466,697; 4,422,719; and 3,641,332. Some such devices have included reflective sleeves surrounding the light transmitting fiber. For example, the inner surface of the sleeve could be formed with a reflective layer or a layer of material having a relatively low refractive index compared to that of the core, such as air, interposed between the sleeve and the core. However, a particular problem is that such devices do not easily lend themselves to transporting sufficient light for illumination because of the size necessary. In addition, utilization of such devices would be bulky and require a substantial amount of material, which would increase their weight and cost.

In addition, optical wave guides have been utilized to guide electro-magnetic wave energy, as illustrated in U.S. Pat. Nos. 4,453,803; 3,973,828; 3,583,786; 3,506,331; 3,436,141; and 3,386,043. Such devices include a sleeve portion or a hollow optical fiber. Similar to the optical light pipes or light guides described above, such devices have had a problem associated with the assembly and cost of the devices. Also, such devices are designed primarily to carry information for communication purposes in a single electromagnetic mode to increase the bandwidth of the information. This requires a highly specialized light source and optical system to properly direct quasi-monochromatic light into the device for propagation.

Further, a light guide made of a transparent material having substantially planar inner and outer surfaces which are "in octature" has been utilized to transport light, as illustrated in U.S. Pat. No. 4,260,220. This device is the most pertinent to the present invention. The device includes rigid polymeric sheets of a transparent material having a structured surface on one side and a smooth surface opposite the structured surface on the other side whereby light entering the light guide at an angle less than a predetermined maximum is totally internally reflected. However, a significant problem or limitation has been encountered with the use of such devices, namely the fact that it is restricted or constrained to a relatively small angular range of acceptable light rays. In addition, optical constraints require that the flatness of the sides be rigidly maintained in order to efficiently transport light material and labor costs associated with the assembly or construction of individual planar sections "in octature" to form such a rigid light guide are economic limitations.

The art as discussed above does not describe or disclose a hollow, tubular light conduit including a wall, of a transparent material, having a structured surface on one side and a smooth surface opposite the structured surface on the other side lying at least partially, in cross-section, in a smooth arcuate curve, which will achieve total internal reflection so that a predetermined portion of the light, incident within an acceptable angular range, is contained by total internal reflection for transporting and/or distributing the light. In addition, it does not describe a light conduit which because of its ability to totally internally reflect incident light within an acceptable angular range, may be utilized in light fixtures and lighting systems to transport and to distribute non-coherent, wideband solar light or artificial light for a variety of purposes. Also, the art does not describe a light conduit which is able to attain a variety of cross-sectional shapes with a portion of the wall lying in a smooth arcuate curve, while maintaining total internal reflection.

SUMMARY OF THE INVENTION

The present invention provides a totally internally reflecting light conduit for transporting and/or distributing the light including a wall, of a transparent material, having a structured surface on one side and a smooth surface opposite the structured surface on the other side, and at least a portion of the cross-section of the wall lying in a smooth arcuate curve. The structured surface consists of a linear array of substantially right angled isosceles prisms arranged side by side. The perpendicular sides of each prism make an angle of approximately 45° with the tangent to the adjacent smooth surface opposite the structured surface. Even though a portion of the wall lies in a smooth arcuate curve, light entering the light conduit within an acceptable angular range is contained by total internal reflection as it travels along the length of the light conduit. Further, under certain conditions, the efficiency of the light transportability of the light conduit is enhanced as it approaches a circular or an elliptical cross-section.

The ability to maintain reflectivity while only requiring that a portion of the wall lie in an arcuate curve, results in the light conduit being able to attain a variety of cross-sectional shapes or configurations, such as, for example, circular or elliptical. This eliminates optical constraints regarding construction and orientation of the wall, and substantially reduces cost and increases the total amount of light acceptable for transportation and/or distribution. Also, the linear array of right angled isosceles prisms may be disposed parallel or at almost any angle to the axis of the conduit. However, light will only be totally internally reflected and transported along the length of the light conduit if it is properly directed into the light conduit.

Advantages of the light conduit of the present invention are the ability to attain a variety of cross-sectional shapes, and that it can be used in light fixtures and lighting systems to transport and distribute light when the light conduit is manipulated to allow some of the light to pass through the wall of the light conduit without being totally internally reflected. Thus, the light conduit can be easily integrated into present light fixtures without the need for specialized equipment or substantial redesign of the fixture.

A fixture according to the present invention comprises a housing, generally opaque, surrounding a light conduit, and at least one side of the housing includes an optical window through which light is emitted and distributed from the housing for illumination or for use as a secondary light source. A diffuser may be placed in the optical window to redistribute or disperse the light in a desired fashion, such as, for example, to scatter, soften or spread the light more evenly. The light source may include solar energy and/or artificial light.

DESCRIPTION OF THE DRAWINGS

The present invention will be more fully described with reference to the accompanying drawings wherein like reference numerals identify corresponding components, and.

DETAILED DESCRIPTION OF A PREFERRED EMBODIMENT

Figure 1:
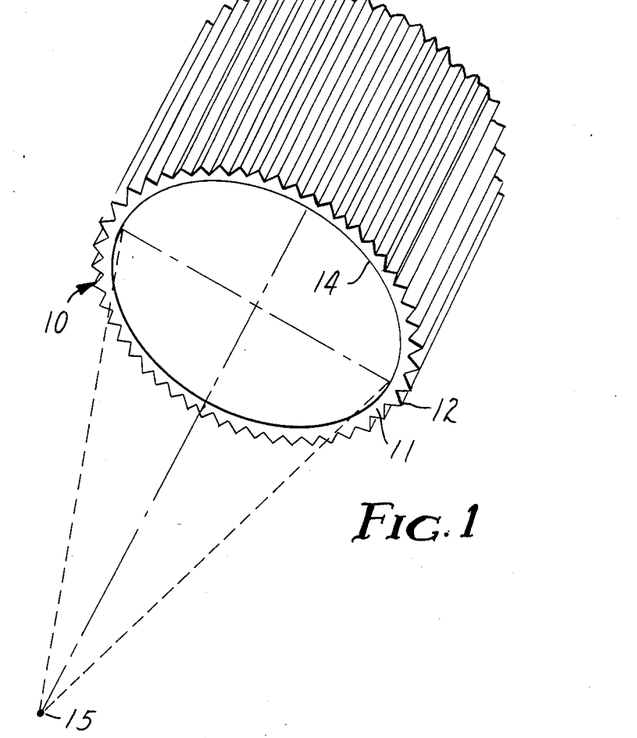
FIG. 1 is a perspective view of a light conduit of the present invention.
Figure 2:
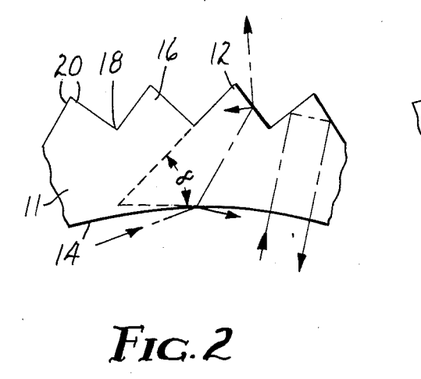
FIG. 2 is a fragmentary end view of the light conduit of FIG. 1.
Figure 3:
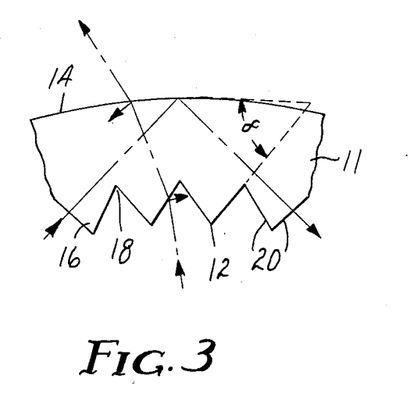
FIG. 3 is a fragmentary end view similar to FIG. 2 depicting the light conduit when the smooth surface is on the outer side.

Referring to FIG. 1 of the drawings, a hollow, tubular light conduit of the present invention, generally designated 10, may be used to transport and/or distribute a predetermined portion of light within the conduit. The light conduit includes a wall 11, of a transparent material, having a structured surface 12 on one side and a smooth surface 14 opposite the structured surface on the other side, and at least a portion of the cross-section of the wall lying in a smooth arcuate curve. Incident light from a light source 15 striking either of the surfaces 12 or 14, within an acceptable angular range, will be totally internally reflected at the other surface, as illustrated in FIGS. 2 and 3. The light will be totally internally reflected when the light refracted by the first surface strikes the second surface at an angle, with respect to the normal, greater than the critical angle. This critical angle is defined as the arc sine of the ratio of the index of refraction of the surrounding medium (typically air) to that of the wall material. In addition, a significant portion of the incident light striking either of the surfaces 12 or 14, outside the acceptable angular range, will be transmitted and the remainder will be reflected, as illustrated in FIGS. 2 and 3. In either situation, there is negligible absorption of light by the wall material.

The structured surface 12 includes a linear array of substantially right angled isosceles prisms 16 arranged side-by-side in parallel relationship to form a plurality of grooves 18 running the length of the light conduit 10, as illustrated in FIGS. 2 and 3. The perpendicular sides 20 are nominally flat and make an angle alpha ($\alpha$), of approximately 45°, with the tangent to the adjacent smooth surface 14. The exactness of the prisms and their orientation is essential for light transportation, but is not as essential for illumination or for use as a secondary light source.

The particular material used for the wall 11 of the light conduit 10 may vary, but it is intended that in most applications the material be generally flexible. It is, however, essential that the material be transparent, and preferably homogeneous and isotropic, such as for example polymeric materials or glass. Useful polymeric materials for this purpose are commercially available grades of, for example, acrylics and polycarbonates having nominal indices of refraction of 1.49 and 1.58, respectively. Other useful polymers are polypropylenes, polyurethanes, polystyrenes, polyvinyl chlorides, and the like. The particular material selected is not significant to the invention hereof, so long as it provides the described function. Normally, the manufacturers of this product will select the best commercially available material based upon price, application and manufacturing process. However, acrylics and polycarbonates are of particular interest because of their high indices of refraction and physical properties, i.e. weatherability, ultraviolet resistance, dimensional stability, and temperature tolerance to name a few.

There are several ways to mass produce the wall 11 of the light conduit 10 of the present invention which are well known to those skilled in the art, for example as illustrated in U.S. Pat. Nos. 3,689,346, 4,244,683, 4,576,850 and U.K. patent application No. GB 2,127,344A, the disclosures of which are hereby incorporated by reference. The particular manufacturing process is not essential to the present invention, and is a matter of choice based upon economics and availability. However, it is preferred that a thin, flexible film be utilized as disclosed in U.S. patent application Ser. No. 799,869 (abandoned) inventor Sanford Cobb, Jr. and filed concurrently herewith), the disclosure of which is hereby incorporated by reference. Such a film may be curled into a tubular configuration and the seam fastened by welding, or for particular applications, it may be acceptable to simply overlap or join the edges. In addition, it should be appreciated that the light conduit 10 may be extruded or molded to provide a flexible or rigid unitary member. The description of the present light conduit 10 and its use will proceed on the basis of its being formed by curling a thin, flexible film.

Figure 4:
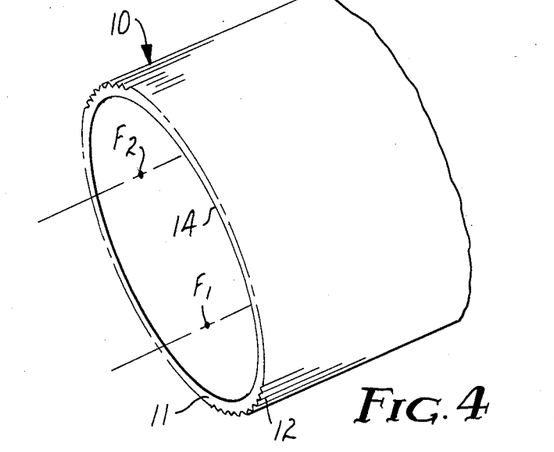
FIG. 4 is a perspective view of the light conduit having an elliptical cross-section.

The thickness of the wall of the light conduit is not particularly essential to the present invention. However, the applicability of the light conduit 10 is dependent upon the thickness of the wall to the extent that the curled film or unitary conduit may be formed into a variety of tubular cross-sectional shapes, such as circular or elliptical, as illustrated in FIGS. 1 and 4. For example, an acrylic film having a nominal thickness of 0.015 of an inch and having about 70 prisms per inch exhibits sufficient flexibility to be capable of being curled into a cylindrical light conduit 10 having a minimum diameter of approximately 3 inches. In addition, such a film will be rigid and self-supporting enough to easily maintain its shape when curled into a cylindrical light conduit 10 having a diameter of approximately 18 inches. This ability to maintain reflectivity results in the light conduit 10 being able to be utilized in a variety of ways, and eliminates the prior requirement that the optically functional surfaces be rigidly maintained "in octature".

It has been found that certain cross-sectional shapes, especially circular and elliptical, provide enhanced optical performance by increasing the acceptable angular range of transportable light rays. A prior art light guide 30, see FIG. 5, with planar walls 31 and of rectangular cross-section with the structured surface 32 on the outer side, is restricted with respect to the angular range of rays which can be transported. In contrast, light conduits 10 of the present invention, having at least a portion of the wall 11 lying in a smooth arcuate curve, accept a greater angular range of light rays. Specifically, as illustrated in FIG. 6, a circular cross-sectional light conduit 10, with the prisms 16 on the outer, convex side, has been found to provide optimum performance. However, it should be appreciated that a variety of cross-sectional shapes may be utilized depending upon the requirements of the application, and that the structured surface 12 may be on the inner side, as long as at least a portion of the wall 11 lies in a smooth arcuate curve. The following analysis will proceed on the basis of the light conduit illustrated in FIG. 6.

Figures 7, 8, 10:
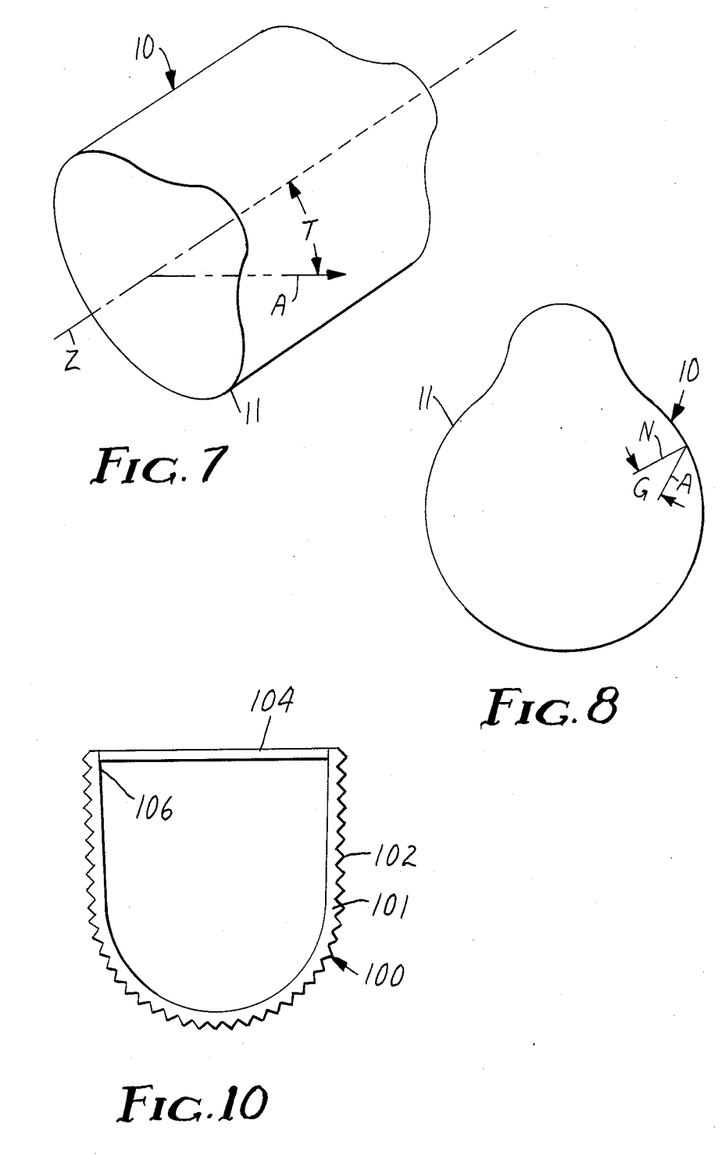
FIG. 7 is a perspective view of the light conduit illustrating light ray geometry.
FIG. 8 is an end view of the light conduit illustrated in FIG. 7.
FIG. 10 is an end view of the light conduit including a reflective surface.

To demonstrate this point clearly, it is necessary to define angles T and G, as illustrated in FIGS. 7 and 8. As illustrated in FIG. 7, angle T is the angle between a given light ray A and the axis Z of the light conduit 10, which is assumed in this case to be parallel to the direction of the prisms. Angle G is the angle, when viewed in cross-section, between the given light ray A and the normal N to the wall 11 of the light conduit 10, as illustrated in FIG. 8. It can be determined that for a given angle T there is a maximum acceptable angle of G, i.e. $G_{max}$, for light transport, beyond which light may escape the light conduit 10. Conversely, for a given angle G there is a maximum acceptable angle of T, i.e. $T_{max}$, for the incident light ray A. However, when angle T is less than $T_{max}$ (27.3 degrees for a wall material with a refractive index of 1.493), all values of angle G are allowed.

Figure 5:
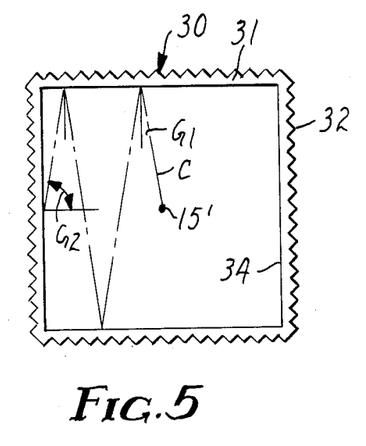
FIG. 5 is an end view of a prior art light guide showing the front surface reflection of light rays.
Figure 6:
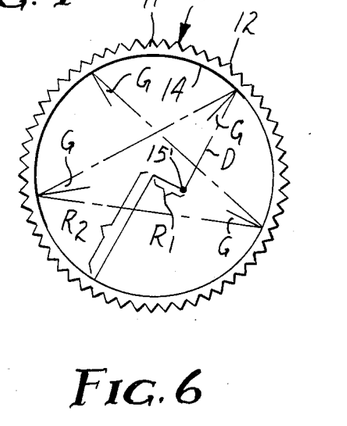
FIG. 6 is an end view of the light conduit of FIG. 1 illustrating the front surface reflection of light rays.

In the rectangular prior art light guide 30, as illustrated in FIG. 5, the acceptable angular range (defined by the maximum value of the angle T, i.e. $T_{max}$) is restricted to 27.3 degrees. The angular range of acceptable rays is limited because any ray can reflect from opposite smooth surfaces 34 of the light guide 30 enough times to reach an adjacent smooth surface 34, where the angle G may approach 90 degrees. This is illustrated for the case of a light source point 15' centered in the light guide 30 in FIG. 5. The light ray C initially strikes the smooth surface 34 of wall 31 at angle G1, but after several first surface reflections strikes the adjacent smooth surface 34 at angle G2 equal to (90−G1) degrees. Thus, G2 may approach 90 degrees, as G1 approaches zero.

In the circular light conduit 10 of the present invention, illustrated in FIG. 6, however, no increase in angle G can occur because of the geometrical symmetry of the light conduit. Thus, the circular light conduit 10 has an acceptable angular range of 90 degrees for a light source point at the center of curvature, i.e. R1=0. A light ray D which strikes the smooth surface 14 initially at some angle G will always strike the smooth surface 14 at that same angle G and the angle will never increase or decrease, as illustrated in FIG. 6, for the case of a light source point 15' not centered in the circular light conduit 10.

Light that is not reflected at the smooth surface 14 passes through a curved interface, undergoes total internal reflection at the prism surfaces 20, and returns to the hollow inside of the light conduit 10 through the same curved surface. The net effect of this double passage through curved surface is to diverge the light beam as if it has passed through a negative lens. Because of the small prism 16 size in relation to the radius of curvature R, the paraxial lens approximation can be applied, the thin lens approximation can be used because the wall 11 is thin in relation to the radius of curvature.

The maximum divergence (change in angle G) can therefore be determined as follows:

$$G2 - G1 = y/F,$$

where

G1 and G2 are the projected ray angles G with respect to the symmetry axis (the radial bisector) before and after refraction, respectively;

y is the ray height (distance from the rays point of incidence to the symmetry axis); and F is the focal length of the lens. $F = 2(n' - 1)/R$, where R is the radius of curvature and $n'$ is the effective index of refraction defined above.

Therefore, the change (G2−G1) in angle may be positive or negative and will have magnitude y/F. Plugging in approximate values for y and F and assuming a moderate value (20 degrees) for angle T, we find that the maximum value of (G2−G1) is in the vicinity of 1.3 degrees. In conclusion, the angle G for the ray which is reflected by total internal reflection (TIR) may increase or decrease by up to 1.3 degrees, while the average ray will be deviated much less. The net effect of this refractive power is to gradually fan the rays out in the transverse direction.

Since the angle G is defined and fixed by the light source in the case of a circular light conduit, the maximum allowable angle of T, i.e. $T_{max}$, is also defined by the light source. The relationship between each point on the light source and the maximum allowable angle of T, i.e. $T_{max}$, is determined by the following equations, referencing FIG. 6, where R1 is the distance from the light source point 15' to the center of the light conduit 10 having a radius of curvature R2, and where n is the index of refraction of the wall material and n' is the effective index of refraction. This relationship of R1/R2 (or sin G) is illustrated by the graph in FIG. 9 wherein the shaded area represents acceptable angles.

$$G_{max} = \sin^{-1}\left(\frac{R1}{R2}\right)$$

Find $T_{max}$ from $n'$ and $G_{max}'$ where $$G_{max} = \sin^{-1}\left\{ n' \sin\left[ 45° - \sin^{-1}\left(\frac{1}{n'}\right) \right] \right\}$$

and $$n' = n \left[ \frac{1 - \frac{\cos^2(T_{max})}{n^2}}{1 - \cos^2(T_{max})} \right]^{\frac{1}{2}}.$$

Figure 9:
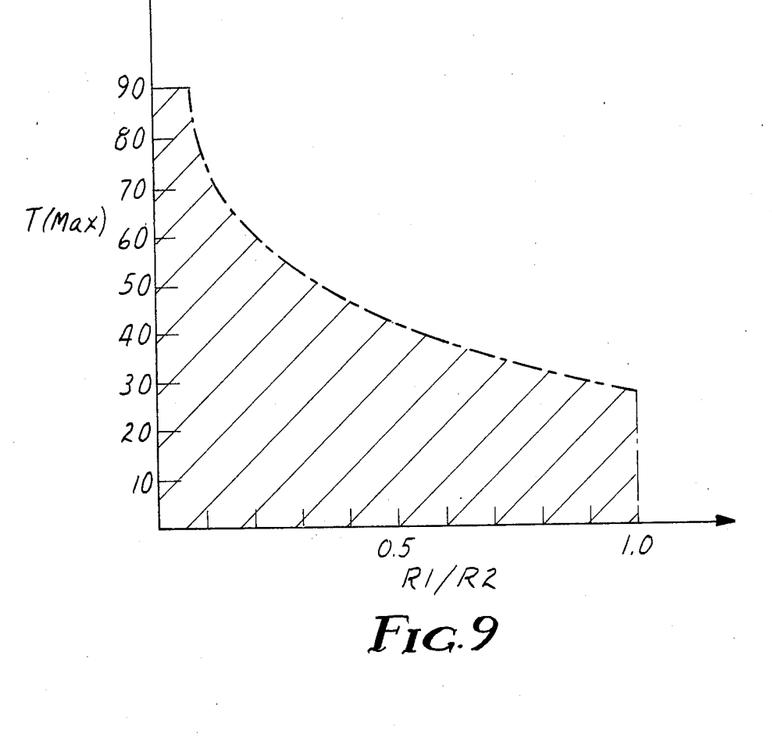
FIG. 9 is a graph illustrating the mathematical relationship between the angles of light rays.

When R1 = R2 (i.e. the light source point 15' lies on the smooth surface 14 of the light conduit 10) $G_{max}$ is 90 degrees, and the same $T_{max}$ (27.3 degrees when n = 1.493) as the rectangular light guide 30 is obtained. But when the light source point 15' is inside the light conduit 10, as is much more commonly the case, the maximum allowable angle of T, i.e. $T_{max}$, increases significantly, as shown in the graph of FIG. 9, which illustrates the relationship between the ratio R1/R2 (or sin G) and the maxium allowable value of the angle T, i.e. $T_{max}$. This means that more of the light from the light source can be transported without loss, and makes the light conduit design simpler and more efficient.

In addition, as illustrated in FIG. 10, a light conduit 100 can be formed by curling the film or molding the unitary conduit into a wall 101 having at least one open side 106. A reflective surface 104, such as a mirror, may be associated with the opening 106 so that light directed into the light conduit 100 and incident upon the reflective surface 104 is redirected within the light conduit 100.

Application and Use

Several of the various applications and uses of the light conduit 10 of the present invention will now be described. The most promising and revolutionary use of the light conduit 10 is due to its ability to be formed into a variety of cross-sectional shapes while maintaining total internal reflection so that light properly directed into the light conduit 10 is transported and/or distributed as it travels along the length of the light conduit. The light conduit 10 may be formed with the structured surface 12 on the inner concave side or on the outer convex side. For example, when optimum light transport is required, the light conduit 10 may be formed having a circular cross-section with the prisms on the outer convex side and parallel to the axis of the light conduit and the smooth surface 14 being glossy. Also, it should be appreciated that the light conduit may be similarly formed with an elliptical cross-section when utilizing a small light source located at one of the foci F$_1$ or F$_2$, as illustrated in FIG. 4. In addition, for particular applications, the linear array of prisms 16 may be disposed at almost any angle to the axis of the conduit when light from the light source 15 is properly directed. Further, under certain circumstances, the prisms may be disposed orthogonally when the prisms are on the inner concave side.

Figure 11:
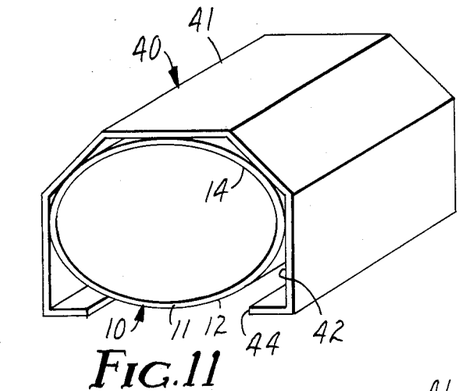
FIG. 11 is a perspective view of a light fixture utilizing the light conduit of the present invention.
Figure 12:
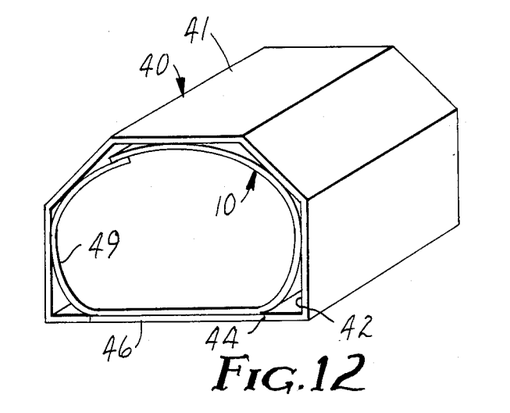
FIG. 12 is a perspective view of an alternative embodiment of the light fixture.
Figure 13:
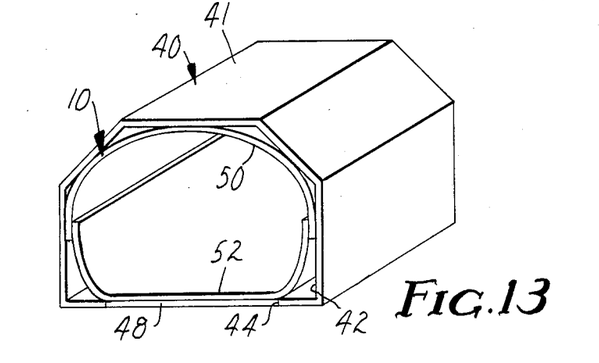
FIG. 13 is a perspective view of a second alternative embodiment of the light fixture.
Figure 14:
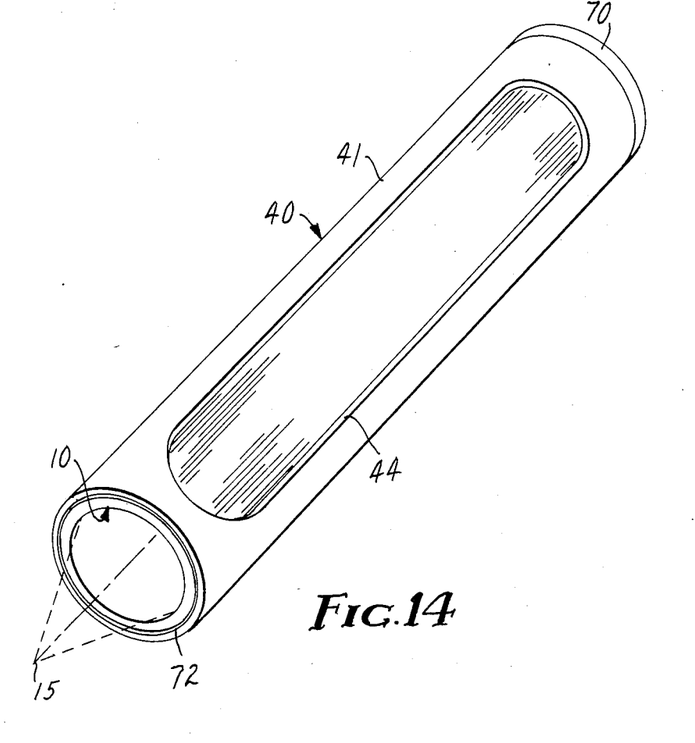
FIG. 14 is a perspective view of a further embodiment of the light fixture.

The performance of the light conduit 10 may be manipulated so that it may be used to transport and distribute light by, either singularly or in combination, adding diffusing or reflecting particles, or by incorporating imperfections, such as non-optically smooth prism surfaces and/or non-optically sharp corners, or structuring the smooth surface 14. Thus, the light conduit 10 may be used as a light fixture or in a light fixture 40 as an illuminator or a secondary light source, as illustrated in FIG. 11 wherein a manipulated light conduit 10 is placed in a housing 41 having an inner surface 42. The housing may be made by forming, bending or extruding a suitable material, such as aluminum, and for increased efficiency a specular or diffuse reflective coating may be provided to the inner surface 42. The surface 42 may include a plurality of reflective elements (not shown) which direct light striking the elements in a desired direction for transporting or illuminating purposes. Thus, light may be directed into the light fixture and emitted through at least one optical window 44, such as, for example, an opening in the housing, for illumination or for use as a secondary light source, as illustrated in FIGS. 12, 13, and 14. In addition, a diffuser 46 may be provided in the window 44 to redistribute or disperse the light in a desired fashion, as illustrated in FIG. 12. Also, a sign 48 or the like may be provided in the window 44 for advertising, displaying, signaling or warning purposes, as illustrated in FIG. 13.

When the light fixture operates as a warning light, as illustrated in FIG. 14, for emergency vehicles, barricades and the like, it is preferred that a light source which produces high-intensity short-duration light pulses, such as a strobe light by electric discharge in a gas, be associated at one end of the light conduit 10. It should also be appreciated that an incandescent light or other light source can be used. In addition, reflector 70 should be associated with the other end so that the light reflects back up the light conduit 10 to aid in the even distribution of the light through the optical window 44. Further, it has been found that it is possible to eliminate hot spots near certain light sources by covering a portion of the light conduit 10 adjacent the light source with an opaque reflector 72.

The light conduit 10, for ease of assembly or replacement in the light fixture 40, may be formed by overlapping the edges of the thin, flexible film 49, as illustrated in FIG. 12 or by overlapping two pieces of film 50 and 52 as illustrated in FIG. 13, wherein the housing 41 cooperates with the forces exerted by the curling of the film into a hollow, tubular light conduit 10 while maintaining an advantageous degree of acceptable angles. This allows for long light fixtures and light conduits, relative to the cross-section, to be used.

A suitable light source 15 may include an artificial source, as disclosed, for example, in U.S. Pat. No. Re. 28,100; U.S. Pat. Nos. 3,417,288; 3,369,149; 3,312,853; 3,263,126; 3,127,113; 1,837,091 and 247,229, the disclosures of which are hereby incorporated by reference, or the utilization of solar energy, as disclosed, for example, in U.S. Pat. Nos. 4,389,085; 4,297,000; 3,511,559; 2,022,144; and 729,660, the disclosures of which are hereby incorporated by reference.

Figure 15:
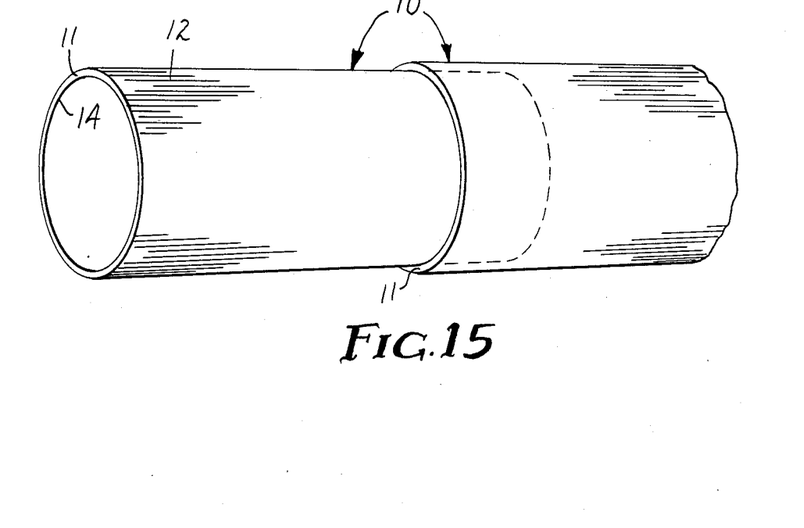
FIG. 15 is a schematic, perspective view of two light conduits of the present invention showing a telescoping feature for interconnecting the light conduits.
Figure 16:
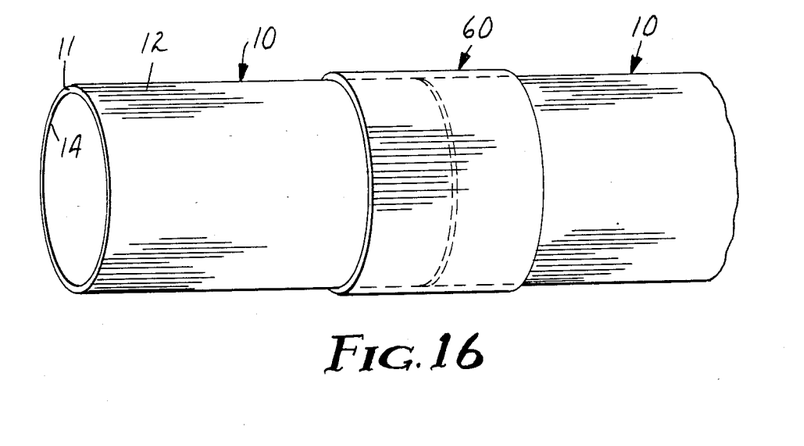
FIG. 16 is a schematic, perspective view showing two light conduits of the present invention and a sleeve for interconnecting the light conduits.

To provide for ease of interconnection, as illustrated in FIG. 15, a length of conduit 10 may be telescopically tapered or alternatively diametered so that one length may be inserted into another to transport and/or illuminate as part of a lighting system or any other purpose. As an alternative, sections of the light conduit 10 may be abutted and a sleeve 60 of the same material placed over the abutting ends, as illustrated in FIG. 16.

While a preferred embodiment of the present invention and several alternative embodiments have been described so as to enable one skilled in the art to practice the techniques of the present invention, the preceding description is intended to be exemplary and should not be used to limit the scope of the invention. The scope of the invention should be determined only by reference to the following claims.

I claim:

1. A hollow, tubular light conduit for transporting light there along and/or distributing light therefrom, comprising a wall member of a transparent material, said wall member including a structured surface on one side and a smooth surface opposite said structured surface on the other side, at least a portion of the cross-section of said wall member lying in a smooth arcuate curve, said structured surface having a linear array of substantially right angled isosceles prisms arranged side-by-side, the perpendicular sides of said prisms making an angle of approximately 45° with the tangent to said smooth surface opposite said structured surface, so that a predetermined portion of the light entering the light conduit within an acceptable angular range, is contained by total internal reflection as it travels along the length of the light conduit.

2. The light conduit defined in claim 1 wherein said wall member is substantially circular in cross-section.

3. The light conduit defined in claim 2 wherein said smooth surface is disposed on the inner side of said wall member and incident light striking said smooth surface within an acceptable angular range is totally internally reflected, and said prisms run parallel to the axis of said wall member.

4. The light conduit defined in claim 2 wherein said structured surface is disposed on the inner side of said wall member and incident light striking said structured surface within an acceptable angular range is totally internally reflected, and said prisms run parallel to the axis of said wall member.

5. The light conduit defined in claim 1 wherein said wall member is substantially elliptical in cross-section.

6. The light conduit defined in claim 1 wherein said transparent material is a polymeric material.

7. The light conduit defined in claim 1 further comprising performance manipulating means associated with said wall member for allowing some of the light to be emitted from said light conduit through said wall member without being totally internally reflected.

8. The light conduit defined in claim 7 wherein said performance manipulating means includes non-optically sharp corners of said prisms.

9. The light conduit defined in claim 7 wherein said performance manipulating means includes non-optically smooth surfaces of said wall member.

10. A light fixture, comprising:
a housing having an inner surface and an outer surface;
a hollow, tubular light conduit contained within said housing including a wall member of a transparent material, said wall member having a structured surface on one side and a smooth surface opposite said structured surface on the other side, and at least a portion of the cross-section of said wall member lying in a smooth arcuate curve, said structured surface having a linear array of substantially right angled isosceles prisms arranged side-by-side, the perpendicular sides of said prisms making an angle of approximately 45° with the tangent to said smooth surface opposite said structured surface;
performance manipulating means associated with said wall member for allowing light to be emitted from said light conduit through said wall member without being contained within said light fixture by total internal reflection;
optical window means in said housing for allowing the emission of light from said light conduit through said optical window means; and
light source means associated with said light conduit for supplying light into said light conduit so that light entering said light conduit may be emitted from said light conduit and may thereby exit from said light fixture through said optical window means.

11. The light fixture defined in claim 10 wherein said transparent material is a polymeric material.

12. The light fixture defined in claim 10 wherein said hollow, tubular light conduit is substantially circular in cross-section.

13. The light fixture defined in claim 10 further comprising diffuser means associated with said optical window means for dispersing the light exiting said light conduit through said optical window in a desired fashion.

14. The light fixture defined in claim 10 wherein said light source means includes means for collecting and directing solar energy into said light conduit.

15. The light fixture defined in claim 10 wherein said light source means includes a source of artificial light.

16. The light fixture defined in claim 15 wherein said source of artificial light is a strobe light which is associated with one end of said light conduit.

17. The light fixture defined in claim 16 further comprising reflective means associated with the other end of said light conduit for reflecting light incident upon said reflective means back up said light conduit to aid in the even distribution of light through said optical window means.

18. The light fixture defined in claim 10 further comprising reflective coating means associated with the inner surface of said housing for reflecting said light emitted from said light conduit and striking said reflective coating means back through said wall member.

19. The light fixture defined in claim 10 further comprising message means associated with said optical window means for viewing, whereby said light conduit acts as a secondary light source so that said message means may be observed.

20. A light conduit, comprising:
a member including at least one open side, an inner side, an outer side and a wall of a transparent material, said wall having a structured surface on one side and a smooth surface opposite said structured surface on the other side, at least a portion of the cross-section of said wall lying in a smooth arcuate curve, said structured surface having a linear array of substantially right angled isosceles prisms arranged side-by-side, the perpendicular sides of said prisms making an angle of approximately 45° with the tangent to said smooth surface opposite said structured surface, whereby a predetermined portion of the light entering the light conduit within an incorporating imperfections acceptable angular range is contained by total internal reflection as it travels along the length of the light conduit.

21. The light conduit defined in claim 20 further comprising reflective means associated with the open side of said channel member for redirecting light incident upon said reflective means into said channel member.

22. The light conduit defined in claim 21 wherein the transparent polymeric material forming said wall has a total thickness of 0.015 of an inch and said prisms are placed thereon between 50 to 75 prisms per inch of said wall transverse to said prisms.

23. The light conduit defined in claim 20 wherein said smooth surface is disposed on said inner side of said open channel member and incident light striking said smooth surface within an acceptable angular range is totally internally reflected.

24. The light conduit defined in claim 20 wherein said structured surface is disposed on said inner side of said open channel member and incident light striking said structured surface within an acceptable angular range is totally internally reflected.

25. The light conduit defined in claim 20 further comprising performance manipulating means associated with said wall of said open channel member for allowing light to be emitted from said light conduit through said wall without being totally internally reflected.

26. The light conduit defined in claim 25 wherein said performance manipulating means includes non-optically sharp corners of said prisms.

27. The light conduit defined in claim 25 wherein said performance manipulating means includes non-optically smooth surfaces of said wall.

28. The light conduit defined in claim 20 wherein said open channel member is generally U-shaped in cross-section.

29. The light conduit defined in claim 20 wherein said reflective means includes light diffuser means for redistributing the light in a desired fashion.

30. A warning light, comprising:
a hollow, tubular housing having an inner surface and an outer surface;
a hollow, tubular light conduit contained within said housing including a wall member of a transparent material, said wall member having a structured surface on one side and a smooth surface opposite said structured surface on the other side, said structured surface having a linear array of substantially right angled isosceles prisms arranged side-by-side, the perpendicular sides of said prisms making an angle of approximately 45° with the tangent to said smooth surface opposite said structured surface;
optical window means in said housing for allowing the emission of light from said light conduit through said optical window means;
light source means associated with one end of said light conduit for supplying light into said light conduit so that light entering said light conduit may be emitted from said light conduit and may thereby exit from said light fixture through said optical window means.

31. The warning light defined in claim 30 wherein said light source means includes a strobe light which produces high-intensity short-duration light pulses by electric discharge in a gas.

32. The warning light defined in claim 30 wherein said hollow, tubular housing is substantially circular in cross-section, and wherein said hollow tubular light conduit is substantially circular in cross-section.

33. The warning light defined in claim 30 further comprising diffuser means associated with said optical window means for dispersing the light exiting said light conduit through said optical window in a desired fashion.

34. The warning light defined in claim 30 further comprising performance manipulating means associated with said wall member for allowing light to be emitted from said light conduit through said wall member without being contained by total internal reflection.

35. The warning light defined in claim 30 wherein said performance manipulating means includes non-optically sharp corners of said prisms to permit light leakage.

36. The warning light defined in claim 30 further comprising reflective means associated with the other end of said light conduit for reflecting light incident upon said reflective means back up said light conduit to aid in the even distribution of light through said optical window means.

* * * * *